(12) United States Patent
Li et al.

(10) Patent No.: US 7,059,948 B2
(45) Date of Patent: Jun. 13, 2006

(54) ARTICLES FOR POLISHING SEMICONDUCTOR SUBSTRATES

(75) Inventors: Shijian Li, San Jose, CA (US); Llang-Yuh Chen, Foster City, CA (US); Alain Duboust, Sunnyvale, CA (US)

(73) Assignee: Applied Materials, Santa Clara, CA (US)

( * ) Notice: Subject to any disclaimer, the term of this patent is extended or adjusted under 35 U.S.C. 154(b) by 360 days.

(21) Appl. No.: 10/026,854

(22) Filed: Dec. 20, 2001

(65) Prior Publication Data

US 2002/0102853 A1    Aug. 1, 2002

Related U.S. Application Data

(60) Provisional application No. 60/258,162, filed on Dec. 22, 2000.

(51) Int. Cl.
*B24D 11/00* (2006.01)

(52) U.S. Cl. .................. 451/527; 451/5; 451/287

(58) Field of Classification Search ............. 451/527, 451/5, 8, 287, 285, 286, 288
See application file for complete search history.

(56) References Cited

U.S. PATENT DOCUMENTS

| | | | |
|---|---|---|---|
| 1,601,642 | A | 9/1926 | Parker |
| 1,927,162 | A | 9/1933 | Fiedler et al. |
| 2,112,691 | A | 3/1938 | Crowder |
| 2,240,265 | A | 4/1941 | Nachtman |
| 2,392,687 | A | 1/1946 | Nachtman |
| 2,431,065 | A | 11/1947 | Miller |
| 2,451,341 | A | 10/1948 | Jemstedt |
| 2,453,481 | A | 11/1948 | Wilson |
| 2,454,935 | A | 11/1948 | Miller |
| 2,456,185 | A | 12/1948 | Grube |
| 2,457,510 | A | 12/1948 | van Ornum |
| 2,458,676 | A | 1/1949 | Brenner et al. |
| 2,461,556 | A | 2/1949 | Lorig |
| 2,473,290 | A | 6/1949 | Millard |
| 2,477,808 | A | 8/1949 | Jones |

(Continued)

FOREIGN PATENT DOCUMENTS

EP    0 325 753    12/1988

(Continued)

OTHER PUBLICATIONS

Nogami, T. "An Innovation to Integrate Porous Low-K Materials and Copper", Interconnect Japan 2001, Honeywell Seminar, Dec. 6, 2001, pp. 1-12.

(Continued)

*Primary Examiner*—Lee D. Wilson
*Assistant Examiner*—Alvin J. Grant
(74) *Attorney, Agent, or Firm*—Patterson and Sheridan

(57) ABSTRACT

Methods, articles of manufacture, and apparatus are provided for depositing a layer, planarizing a layer, or combinations thereof, a material layer on a substrate. In one embodiment, an article of manufacture is provided for polishing a substrate, comprising a polishing article having a polishing surface, a plurality of passages formed through the polishing article for flow of material therethrough, and a plurality of grooves disposed in the polishing surface. The article of manufacture may be used in a processing system. The article of manufacture may be used in a method for processing a substrate, comprising positioning the substrate in an electrolyte solution containing a polishing article, optionally depositing a material on the substrate by an electrochemical deposition method, and polishing the substrate with the polishing article.

31 Claims, 9 Drawing Sheets

U.S. PATENT DOCUMENTS

| | | | |
|---|---|---|---|
| 2,479,323 A | 8/1949 | Davis | |
| 2,480,022 A | 8/1949 | Hogaboom | |
| 2,490,055 A | 12/1949 | Hoff | |
| 2,495,695 A | 1/1950 | Camin et al. | |
| 2,500,205 A | 3/1950 | Schaefer | |
| 2,500,206 A | 3/1950 | Schaefer et al. | |
| 2,503,863 A | 4/1950 | Bart | |
| 2,506,794 A | 5/1950 | Kennedy et al. | |
| 2,509,304 A | 5/1950 | Klein | |
| 2,512,328 A | 6/1950 | Hays | |
| 2,517,907 A | 8/1950 | Mikulas | |
| 2,519,945 A | 8/1950 | Twele et al. | |
| 2,530,677 A | 11/1950 | Berkenkotter et al. | |
| 2,535,966 A | 12/1950 | Teplitz | |
| 2,536,912 A | 1/1951 | Cobertt | |
| 2,539,898 A | 1/1951 | Davis | |
| 2,540,175 A | 2/1951 | Rosenqvist | |
| 2,544,510 A | 3/1951 | Prahl | |
| 2,549,678 A | 4/1951 | Fiandt | |
| 2,554,943 A | 5/1951 | Farmer | |
| 2,556,017 A | 6/1951 | Vonada | |
| 2,560,534 A | 7/1951 | Adler | |
| 2,560,966 A | 7/1951 | Lee | |
| 2,569,577 A | 10/1951 | Reading | |
| 2,569,578 A | 10/1951 | Rieger | |
| 2,571,709 A | 10/1951 | Gray | |
| 2,576,074 A | 11/1951 | Nachtman | |
| 2,587,630 A | 3/1952 | Konrad et al. | |
| 2,619,454 A | 11/1952 | Zapponi | |
| 2,633,452 A | 3/1953 | Hogaboom, Jr., et al. | |
| 2,646,398 A | 7/1953 | Henderson | |
| 2,656,283 A | 10/1953 | Fink et al. | |
| 2,656,284 A | 10/1953 | Toulmin | |
| 2,657,177 A | 10/1953 | Rendel | |
| 2,657,457 A | 11/1953 | Toulmin | |
| 2,673,836 A | 3/1954 | Vonada | |
| 2,674,550 A | 4/1954 | Dunlevy et al. | |
| 2,675,348 A | 4/1954 | Greenspan | |
| 2,680,710 A | 6/1954 | Kenmore et al. | |
| 2,684,939 A | 7/1954 | Geese | |
| 2,689,215 A | 9/1954 | Bart | |
| 2,695,269 A | 11/1954 | de Witz et al. | |
| 2,696,859 A | 12/1954 | Somma | |
| 2,698,832 A | 1/1955 | Swanson | |
| 2,706,173 A | 4/1955 | Wells et al. | |
| 2,706,175 A | 4/1955 | Licharz | |
| 2,708,445 A | 5/1955 | Manson et al. | |
| 2,710,834 A | 6/1955 | Vrilakas | |
| 2,711,993 A | 6/1955 | Lyon | |
| 3,162,588 A | 12/1964 | Bell | |
| 3,334,041 A | 8/1967 | Dyer et al. | |
| 3,433,730 A | 3/1969 | Kennedy et al. | |
| 3,448,023 A | 6/1969 | Bell | |
| 3,476,677 A | 11/1969 | Corley et al. | |
| 3,607,707 A | 9/1971 | Chenevier | |
| 3,873,512 A | 3/1975 | Latanision | |
| 3,942,959 A | 3/1976 | Markoo et al. | |
| 3,992,178 A | 11/1976 | Markoo et al. | |
| 4,047,902 A | 9/1977 | Wiand | |
| 4,082,638 A | 4/1978 | Jumer | |
| 4,119,515 A | 10/1978 | Costakis | |
| 4,125,444 A | 11/1978 | Inoue | |
| 4,312,716 A | 1/1982 | Maschler et al. | |
| 4,523,411 A | 6/1985 | Freerks | |
| 4,704,511 A | 11/1987 | Miyano | |
| 4,713,149 A | 12/1987 | Hoshino | |
| 4,752,371 A | 6/1988 | Kreisel et al. | |
| 4,772,361 A | 9/1988 | Dorsett et al. | |
| 4,793,895 A | 12/1988 | Kaanta et al. | 156/627 |
| 4,934,102 A | 6/1990 | Leach et al. | 51/50 R |
| 4,954,141 A | 9/1990 | Takiyama et al. | |
| 4,956,056 A | 9/1990 | Zubatova et al. | |
| 5,011,510 A | 4/1991 | Hayakawa et al. | |
| 5,061,294 A | 10/1991 | Harmer et al. | |
| 5,066,370 A | 11/1991 | Andreshak et al. | |
| 5,096,550 A | 3/1992 | Mayer et al. | |
| 5,108,463 A | 4/1992 | Buchanan | |
| 5,136,817 A | 8/1992 | Tabata et al. | 51/165.71 |
| 5,137,542 A | 8/1992 | Buchanan et al. | |
| 5,203,884 A | 4/1993 | Buchanan et al. | |
| 5,217,586 A | 6/1993 | Datta et al. | 204/129.6 |
| 5,225,034 A | 7/1993 | Yu et al. | 156/636 |
| 5,235,139 A | 8/1993 | Bengston et al. | |
| 5,238,716 A | 8/1993 | Adachi | |
| 5,257,478 A | 11/1993 | Hyde et al. | |
| 5,370,766 A | 12/1994 | Desaigoudar et al. | |
| 5,380,560 A | 1/1995 | Kaja et al. | |
| 5,478,435 A | 12/1995 | Murphy et al. | |
| 5,510,216 A | 4/1996 | Calabrese et al. | |
| 5,527,215 A | 6/1996 | Rubino et al. | 451/527 |
| 5,529,863 A | 6/1996 | Swirbel et al. | |
| 5,534,106 A | 7/1996 | Cote et al. | 156/636.1 |
| 5,543,032 A | 8/1996 | Datta et al. | 205/670 |
| 5,545,927 A | 8/1996 | Farooq et al. | |
| 5,554,064 A * | 9/1996 | Breivogel et al. | 451/41 |
| 5,560,753 A | 10/1996 | Schnabel et al. | |
| 5,562,529 A | 10/1996 | Kishii et al. | |
| 5,567,300 A | 10/1996 | Datta et al. | 205/652 |
| 5,575,706 A | 11/1996 | Tsai et al. | 451/41 |
| 5,578,362 A | 11/1996 | Reinhardt et al. | |
| 5,624,300 A | 4/1997 | Kishii et al. | 451/36 |
| 5,633,068 A | 5/1997 | Ryoke et al. | |
| 5,654,078 A | 8/1997 | Ferronato | |
| 5,674,122 A | 10/1997 | Krech | |
| 5,702,811 A | 12/1997 | Ho et al. | |
| 5,738,574 A | 4/1998 | Tolles et al. | |
| 5,755,859 A | 5/1998 | Brusic et al. | |
| 5,789,320 A | 8/1998 | Andricacos et al. | |
| 5,804,507 A | 9/1998 | Perlov et al. | 438/692 |
| 5,807,165 A | 9/1998 | Uzoh et al. | 451/41 |
| 5,823,854 A | 10/1998 | Chen | |
| 5,840,190 A | 11/1998 | Scholander et al. | |
| 5,840,629 A | 11/1998 | Carpio | |
| 5,846,882 A | 12/1998 | Birang | 438/692 |
| 5,871,392 A | 2/1999 | Meikle et al. | 451/56 |
| 5,871,655 A | 2/1999 | Lee et al. | |
| 5,882,491 A | 3/1999 | Wardle | |
| 5,893,796 A | 4/1999 | Birang et al. | |
| 5,898,222 A | 4/1999 | Farooq et al. | |
| 5,899,799 A | 5/1999 | Tjaden et al. | 451/287 |
| 5,911,619 A | 6/1999 | Uzoh et al. | 451/5 |
| 5,921,855 A * | 7/1999 | Osterheld et al. | 451/527 |
| 5,938,801 A | 8/1999 | Robinson | |
| 5,944,583 A | 8/1999 | Cruz et al. | 451/41 |
| 5,948,697 A | 9/1999 | Hata | |
| 5,951,380 A | 9/1999 | Kim | 451/65 |
| 5,985,093 A | 11/1999 | Chen | |
| 5,990,012 A | 11/1999 | Robinson et al. | 438/692 |
| 6,001,008 A | 12/1999 | Fujimori et al. | |
| 6,004,880 A | 12/1999 | Liu et al. | |
| 6,017,265 A | 1/2000 | Cook et al. | |
| 6,019,666 A | 2/2000 | Roberts et al. | 451/36 |
| 6,020,264 A | 2/2000 | Lustig et al. | 438/692 |
| 6,024,630 A | 2/2000 | Shendon et al. | 451/41 |
| 6,033,293 A | 3/2000 | Crevasse et al. | 451/494 |
| 6,036,586 A | 3/2000 | Ward | 451/287 |
| 6,056,851 A | 5/2000 | Hsieh et al. | 156/345 |
| 6,066,030 A | 5/2000 | Uzoh | 451/41 |
| 6,074,284 A | 6/2000 | Tani et al. | |
| 6,077,337 A | 6/2000 | Lee | |
| 6,090,239 A | 7/2000 | Liu et al. | |
| 6,091,488 A | 7/2000 | Bishop | |
| 6,103,096 A | 8/2000 | Datta et al. | 205/686 |
| 6,114,097 A | 9/2000 | Malba et al. | |

| | | |
|---|---|---|
| 6,116,998 A | 9/2000 | Damgaard et al. |
| 6,132,292 A * | 10/2000 | Kubo .................... 451/36 |
| 6,153,043 A | 11/2000 | Edelstein et al. |
| 6,156,124 A | 12/2000 | Tobin |
| 6,159,079 A | 12/2000 | Zuniga et al. |
| 6,159,088 A | 12/2000 | Nakajima ................ 451/527 |
| 6,171,467 B1 | 1/2001 | Weihs et al. ............. 205/93 |
| 6,176,992 B1 | 1/2001 | Talieh .................... 205/87 |
| 6,176,998 B1 | 1/2001 | Wardle et al. |
| 6,180,523 B1 | 1/2001 | Lee et al. |
| 6,183,354 B1 | 2/2001 | Zuniga et al. |
| 6,190,494 B1 | 2/2001 | Dow |
| 6,210,257 B1 | 4/2001 | Carlson |
| 6,234,870 B1 | 5/2001 | Uzoh et al. .............. 451/8 |
| 6,238,271 B1 * | 5/2001 | Cesna .................... 451/41 |
| 6,238,592 B1 | 5/2001 | Hardy et al. |
| 6,244,935 B1 | 6/2001 | Birang et al. |
| 6,248,222 B1 | 6/2001 | Wang ................ 204/297.09 |
| 6,251,235 B1 | 6/2001 | Talieh et al. |
| 6,254,456 B1 * | 7/2001 | Kirchner et al. .......... 451/41 |
| 6,255,187 B1 | 7/2001 | Horii |
| 6,257,953 B1 * | 7/2001 | Gitis et al. .............. 451/5 |
| 6,258,223 B1 | 7/2001 | Cheung et al. ........... 204/242 |
| 6,261,168 B1 | 7/2001 | Jensen et al. |
| 6,261,959 B1 | 7/2001 | Travis et al. |
| 6,265,086 B1 | 7/2001 | Harkness |
| 6,273,798 B1 | 8/2001 | Berman |
| 6,273,806 B1 * | 8/2001 | Bennett et al. .......... 451/527 |
| 6,296,557 B1 * | 10/2001 | Walker .................. 451/526 |
| 6,297,159 B1 | 10/2001 | Paton .................... 438/693 |
| 6,319,108 B1 | 11/2001 | Adefris et al. |
| 6,319,420 B1 | 11/2001 | Dow |
| 6,322,422 B1 * | 11/2001 | Satou .................... 451/8 |
| 6,326,303 B1 | 12/2001 | Robinson et al. |
| 6,328,642 B1 | 12/2001 | Pant et al. |
| 6,328,872 B1 | 12/2001 | Talieh et al. |
| 6,331,135 B1 | 12/2001 | Sabde et al. |
| 6,351,422 B1 | 2/2002 | Rohr et al. .............. 365/203 |
| 6,368,184 B1 | 4/2002 | Beckage |
| 6,368,190 B1 | 4/2002 | Easter et al. |
| 6,372,001 B1 | 4/2002 | Omar et al. |
| 6,381,169 B1 | 4/2002 | Bocian et al. |
| 6,383,066 B1 | 5/2002 | Chen et al. |
| 6,386,956 B1 | 5/2002 | Sato et al. |
| 6,391,166 B1 | 5/2002 | Wang |
| 6,395,152 B1 | 5/2002 | Wang |
| 6,402,591 B1 | 6/2002 | Thornton |
| 6,406,363 B1 | 6/2002 | Xu et al. |
| 6,409,904 B1 | 6/2002 | Uzoh et al. |
| 6,426,281 B1 | 7/2002 | Lin et al. |
| 6,428,394 B1 | 8/2002 | Mooring et al. |
| 6,431,968 B1 | 8/2002 | Chen et al. |
| 6,436,816 B1 | 8/2002 | Lee et al. |
| 6,440,295 B1 | 8/2002 | Wang |
| 6,447,668 B1 | 9/2002 | Wang |
| 6,471,847 B1 | 10/2002 | Talieh et al. |
| 6,475,332 B1 | 11/2002 | Boyd et al. |
| 6,486,530 B1 | 11/2002 | Sasagawa et al. |
| 6,497,800 B1 | 12/2002 | Talieh et al. |
| 6,515,336 B1 | 2/2003 | Suzawa et al. |
| 6,517,426 B1 | 2/2003 | Lee |
| 6,520,843 B1 | 2/2003 | Halley |
| 6,537,140 B1 | 3/2003 | Miller et al. |
| 6,537,144 B1 | 3/2003 | Tsai et al. |
| 6,551,179 B1 | 4/2003 | Halley |
| 6,561,889 B1 | 5/2003 | Xu et al. |
| 6,569,004 B1 | 5/2003 | Pham |
| 6,572,463 B1 | 6/2003 | Xu et al. |
| 6,585,579 B1 | 7/2003 | Jensen et al. |
| 6,630,059 B1 | 10/2003 | Uzoh et al. |
| 6,641,471 B1 * | 11/2003 | Pinheiro et al. .......... 451/526 |
| 6,656,019 B1 * | 12/2003 | Chen et al. .............. 451/41 |
| 6,656,827 B1 | 12/2003 | Tsao et al. |
| 6,685,548 B1 | 2/2004 | Chen et al. |
| 6,736,952 B1 * | 5/2004 | Emesh et al. ............. 205/81 |
| 6,739,951 B1 | 5/2004 | Sun et al. |
| 6,752,700 B1 | 6/2004 | Duescher |
| 6,769,969 B1 | 8/2004 | Duescher |
| 6,848,977 B1 | 2/2005 | Cook et al. |
| 6,887,776 B1 | 5/2005 | Shang et al. |
| 2001/0005667 A1 | 6/2001 | Tolles et al. |
| 2001/0024878 A1 | 9/2001 | Nakamura ................ 438/691 |
| 2001/0027018 A1 | 10/2001 | Molnar |
| 2001/0035354 A1 | 11/2001 | Ashjaee et al. |
| 2001/0036746 A1 | 11/2001 | Sato et al. |
| 2001/0040100 A1 | 11/2001 | Wang |
| 2001/0042690 A1 | 11/2001 | Talieh ................... 205/118 |
| 2001/0055851 A1 | 12/2001 | Horii |
| 2002/0008036 A1 | 1/2002 | Wang |
| 2002/0011417 A1 | 1/2002 | Talieh et al. |
| 2002/0020621 A1 | 2/2002 | Uzoh et al. |
| 2002/0025760 A1 | 2/2002 | Lee et al. |
| 2002/0025763 A1 | 2/2002 | Lee et al. |
| 2002/0070126 A1 | 6/2002 | Sato et al. |
| 2002/0077037 A1 | 6/2002 | Tietz |
| 2002/0088715 A1 | 7/2002 | Talieh et al. |
| 2002/0108861 A1 | 8/2002 | Emesh et al. |
| 2002/0119286 A1 | 8/2002 | Chen et al. |
| 2002/0123300 A1 | 9/2002 | Jones et al. |
| 2002/0127836 A1 | 9/2002 | Lin et al. |
| 2002/0130049 A1 | 9/2002 | Chen et al. |
| 2002/0130634 A1 | 9/2002 | Ziemkowski et al. |
| 2002/0146963 A1 | 10/2002 | Teetzel |
| 2002/0148732 A1 | 10/2002 | Emesh et al |
| 2003/0013397 A1 | 1/2003 | Rhoades |
| 2003/0034131 A1 | 2/2003 | Park et al. |
| 2003/0040188 A1 | 2/2003 | Hsu et al. |
| 2003/0104649 A1 | 6/2003 | Ozgur et al. |
| 2003/0114087 A1 | 6/2003 | Duboust et al. |
| 2003/0116439 A1 | 6/2003 | Seo et al. |
| 2003/0116445 A1 | 6/2003 | Sun et al. |
| 2003/0116446 A1 | 6/2003 | Duboust et al. |
| 2003/0213703 A1 | 11/2003 | Wang et al. |
| 2003/0220053 A1 | 11/2003 | Manens et al. |
| 2004/0026786 A1 | 2/2004 | Leu et al. |

FOREIGN PATENT DOCUMENTS

| | | |
|---|---|---|
| EP | 0 455 455 | 4/1991 |
| EP | 1 361 023 | 11/2003 |
| JP | 58-171264 | 10/1983 |
| JP | 61-079666 | 4/1986 |
| JP | 61-265279 | 11/1986 |
| JP | 63-028512 | 2/1988 |
| JP | 05-277957 | 10/1993 |
| JP | 06047678 | 2/1994 |
| JP | 10-006213 | 1/1998 |
| JP | 11042554 | 2/1999 |
| JP | 11-329961 | 3/1999 |
| JP | 11-239961 | 7/1999 |
| JP | 11216663 | 8/1999 |
| JP | 2000-218513 | 8/2000 |
| JP | P2001-077117 | 3/2001 |
| JP | 2001-179611 | 7/2001 |
| JP | 2001-244223 | 9/2001 |
| KR | 2003-037158 | 5/2003 |
| SU | 1618536 | 1/1991 |
| WO | WO 93/15879 | 8/1993 |
| WO | 98/49723 | 11/1998 |
| WO | WO 99/41434 | 8/1999 |
| WO | WO 99/53119 | 10/1999 |
| WO | WO 99/65072 | 12/1999 |
| WO | WO 00/03426 | 1/2000 |
| WO | WO 00/26443 | 5/2000 |
| WO | WO 00/33356 | 6/2000 |
| WO | WO 00/59645 | 10/2000 |

| WO | WO 00/59682 | 10/2000 |
| WO | 00/71297 | 11/2000 |
| WO | WO 01/13416 | 2/2001 |
| WO | 01 49452 | 7/2001 |
| WO | WO 01/52307 | 7/2001 |
| WO | WO 01/63018 | 8/2001 |
| WO | WO 01/71066 | 9/2001 |
| WO | WO 01/88229 | 11/2001 |
| WO | WO 01/88954 | 11/2001 |
| WO | 02 064314 | 8/2002 |
| WO | WO 02/064314 | 8/2002 |
| WO | WO 02/075804 | 9/2002 |
| WO | WO 03/001581 | 1/2003 |

OTHER PUBLICATIONS

International Search Report for PCT/US 02/11009 dated Feb. 6, 2003.
Alexander, Jr., "Electrically Conductive Polymer Nanocomposite Materials", http://www.afrlhorizons.com/Briefs/Sept02/ML0206.html, Date Unknowm.
Contolini, "Electrochemical Planarization of ULSI Copper," Solid State Technology, vol. 40, No. 6, Jun. 1, 1997.
Partial International Search / PCT Invitation to pay additional fees for PCT/US 02/11009 dated Nov. 14, 2002 (4100 PC 02).
Notification regarding review of justification for invitation to pay additional fees for PCT/US/02/11009 (4100 PC 02) dated Feb. 25, 2003.
International Search Report for PCT/US 02/11009 (4100 EP 02) dated Feb. 25, 2003.
PCT Written Opinion dated Apr. 1, 2003. for PCT/US02/11009. (4100 EP 02).
Notification of Transmittal of International Preliminary Examination Report for PCT/US02/11009 dated Nov. 10, 2003. (4100 EP 02).
European Search Report for 03252801.0, dated Jan. 16, 2004. (7047 EP).
Communication Pursuant to Article 96(2) EPC for Application No. 02728965.4, dated Jun. 11, 2004. (4100 EP 02).
Copy of Search Report issued by the Austrian Patent Office for corresponding Singapore Patent Application No. 200302562-4, provided by letter dated Oct. 7, 2004.
Invitation to pay additional fees for PCT/US04/017827 dated Nov. 11, 2004. (4100 P5 PCT).
Notification of Transmittal of International Search Report and Written Opinion for PCT/US04/22722 dated Feb. 21, 2005. (4100 PCT).
PCT International Search Report and Written Opinion dated Apr. 28, 2005 for PCT/US04/037870. (AMAT/4100PC09).
European Search Report for Application No. 00311062.4 dated Aug. 22, 2003. (AMAT/3778EP)

* cited by examiner

ARTICLES FOR POLISHING SEMICONDUCTOR SUBSTRATES

CROSS-REFERENCE TO RELATED APPLICATIONS

This application claims benefit of U.S. provisional Patent Application Ser. No. 60/258,162, filed Dec. 22, 2000, which is herein incorporated by reference.

BACKGROUND OF THE INVENTION

1. Field of the Invention

Embodiments of the invention relate to apparatus and methods for deposition and/or planarization of a material, such as a metal, on a substrate.

2. Background of the Related Art

Sub-quarter micron multi-level metallization is one of the key technologies for the next generation of ultra large scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and now electro-chemical plating (ECP).

Often it is necessary to polish a surface of a substrate to remove high topography, surface defects, metal residues, scratches or embedded particles formed from the deposition and removal of materials from a substrate surface. One common polishing process is known as chemical mechanical polishing (CMP) and is used to improve the quality and reliability of the electronic devices formed on the substrate. CMP is broadly defined herein as polishing a substrate by chemical activity, mechanical activity, or a combination of both chemical and mechanical activity.

Currently, the semiconductor industry is developing processes and apparatus for depositing conductive materials on a substrate and in situ polishing of the substrate to improve manufacturing throughput. One such process is electro-chemical mechanical plating process (ECMPP) which provides for the deposition of a conductive material, such as copper, on a substrate surface in an electrolyte while concurrently polishing the substrate to minimize the amount of conductive material deposited over features on the substrate. Features formed on the substrate include a dense array of narrow features and wide features. Material is deposited over both features at the same rate with the narrow features being filled first and excess material forming over the narrow features as wide features are filled. This excess material over the dense array of narrow features is referred to as the overburden and results in a non-planar surface after deposition. The overburden is typically removed using CMP processes or in some cases etchback processes.

An important goal of polishing, especially in ECMPP, is achieving uniform planarity of the substrate surface with minimal overburden. It is highly desirable that the polishing process uniformly removes material from the surface of substrates as well as removing non-uniform layers, which have been deposited on the substrate. Successful ECMPP also requires process repeatability from one substra The polishing pressure preferably has e next. Thus, uniformity must be achieved not only for a single substrate, but also for a series of substrates processed in a batch.

One difficulty with ECMPP processes is that the conductive material to be deposited may not be evenly distributed in the electrolyte over the surface of the substrate. Uneven distribution over the substrate may result in non-uniformity and the formation of defects, such as voids, in features formed in the surface of the substrate, which can detrimentally affect the quality of the substrate produced using the ECMPP process. One solution to this problem is to use a porous pad during ECMPP to allow electrolyte to reach the substrate surface. However, under current processing conditions, the ECMPP process requires a greater quantity of electrolyte at the substrate surface than what is currently provided by conventional porous polishing pads.

Additionally, for ECMPP processes, the porous pad is required to be held in position during processing to provide for uniform polishing. However, it has been found to be technically challenging to hold a porous pad in position for polishing while allowing electrolyte to flow freely through the pad to the substrate surface.

As a result, there is a need for an article of manufacture, process, and apparatus to improve polishing uniformity during deposition and polishing of a conductive material on a substrate surface.

SUMMARY OF THE INVENTION

Embodiments of the invention generally provides an article of manufacture, a method and an apparatus for depositing a layer, planarizing a layer, or combinations thereof, on a substrate using electrochemical deposition techniques, polishing techniques, or combinations thereof.

In one aspect, an article of manufacture is provided for polishing a substrate comprising a polishing article having a polishing surface, a plurality of passages formed through the polishing article for flow of material therethrough, and a plurality of grooves disposed in the polishing surface.

In another aspect, a method is provided for processing a substrate including positioning the substrate in an electrolyte solution containing a polishing article and polishing the substrate with a polishing article having a polishing surface, a plurality of passages formed through the polishing article for flow of material therethrough, and a plurality of grooves disposed in the polishing surface.

In another aspect, a processing system for forming a planarized layer on a substrate including for depositing and planarizing a material on a substrate including a partial enclosure defining a processing region and having a fluid inlet and a fluid outlet, a shaft connected to the partial enclosure on one end and to an actuator on an opposing end thereof and adapted to rotate the partial enclosure, a polishing article disposed in the partial enclosure, the polishing article having a polishing surface, a plurality of passages formed through the polishing article for flow of material therethrough, and a plurality of grooves disposed in the polishing surface, a diffuser plate disposed in the partial enclosure and positioned below the permeable disc, and a substrate carrier movably disposed above the permeable disc, the substrate carrier having a substrate mounting surface and a plurality of electrical contacts disposed about the perimeter of the substrate receiving surface.

BRIEF DESCRIPTION OF THE DRAWINGS

So that the manner in which the above recited features are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The words and phrases used herein should be given their ordinary and customary meaning in the art by one skilled in the art unless otherwise further defined. Chemical-mechanical polishing should be broadly construed and includes, but is not limited to, abrading a substrate surface by chemical activity, mechanical activity, or a combination of both chemical and mechanical activity. Electropolishing should be broadly construed and includes, but is not limited to, planarizing a substrate by the application of electrochemical activity, such as by anodic dissolution.

Electrochemical mechanical polishing (ECMP) should be broadly construed and includes, but is not limited to, planarizing a substrate by the application of electrochemical activity, mechanical activity, or a combination of both electrochemical and mechanical activity to remove material from a substrate surface. Electrochemical mechanical plating process (ECMPP) should be broadly construed and includes, but is not limited to, electrochemically depositing material on a substrate and concurrently planarizing the deposited material by the application of electrochemical activity, mechanical activity, or a combination of both electrochemical and mechanical activity.

Figure 1:
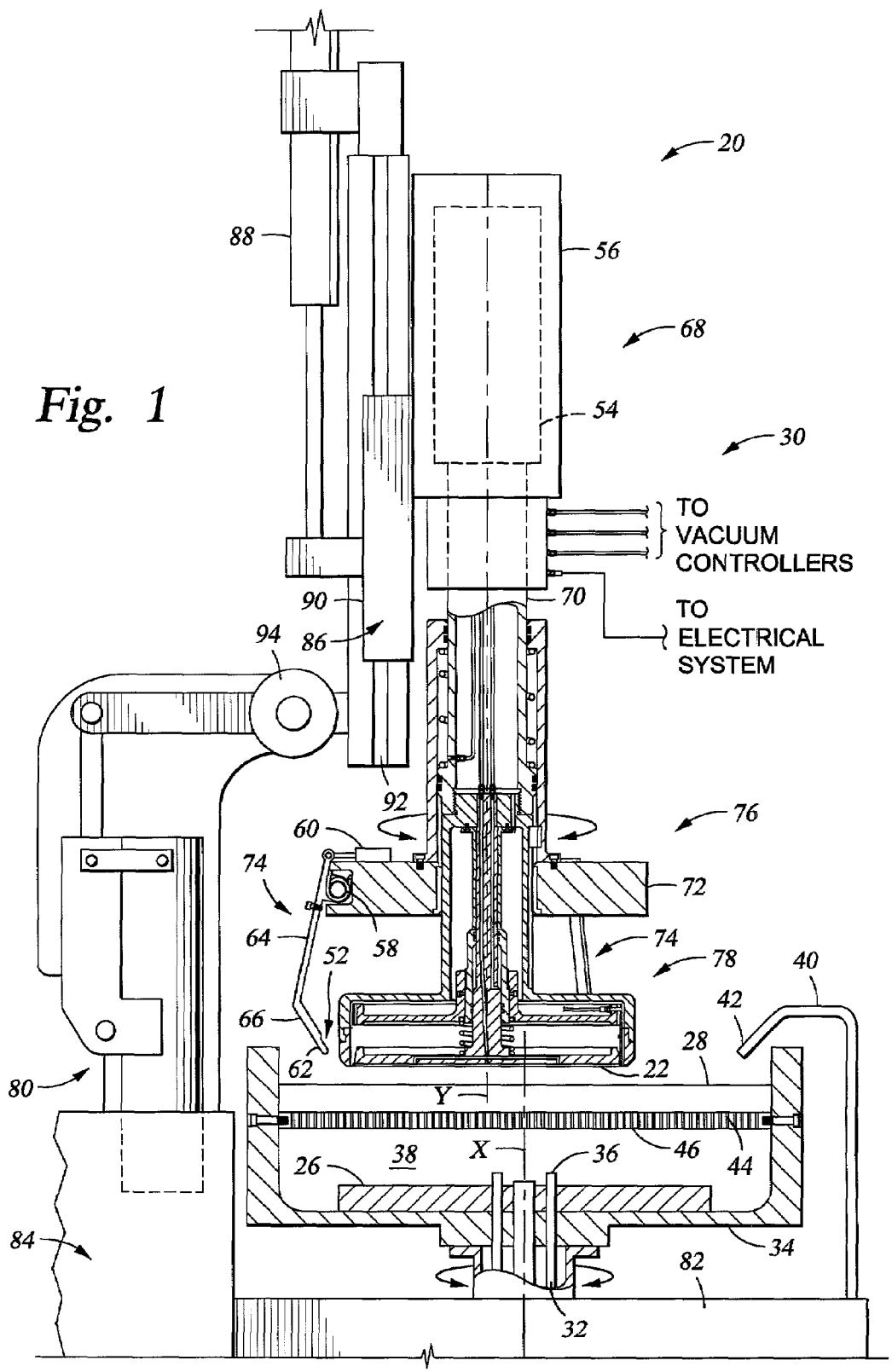
FIG. 1 is a cross sectional view of one embodiment of a processing apparatus showing a substrate disposed above a polishing article.

FIG. 1 is a cross sectional view of one embodiment of an apparatus 20 for depositing a layer, planarizing a layer, or combinations thereof, a metal layer on a substrate 22. One example of an apparatus that may be adapted to benefit from aspects of the invention is an ELECTRA™ electroplating tool, available from Applied Materials, Inc., of Santa Clara, Calif. An example of a suitable electroplating tool is described in co-pending U.S. patent application Ser. No. 09/289,074, filed on Apr. 8, 2000, assigned to common assignee Applied Materials, Inc., the description of which is incorporated herein by reference to the extent not inconsistent with the invention. The apparatus 20 generally includes a carrier head assembly 30 movably supported by a stanchion 80 over a partial enclosure 34. The stanchion 80 and enclosure 34 are generally disposed on a common base 82. The stanchion 80 generally includes a base support 84 and a lift mechanism 86. The base support 84 extends perpendicularly from the base 82 and may be rotatable on its axis so that the carrier assembly 30 may be moved over the partial enclosure 34 or to other positions, for example, to other enclosures or to interface with other processing systems not shown.

The lift mechanism 86 is coupled to the carrier assembly 30. The lift mechanism 86 generally controls the elevation of the carrier assembly 30 in relation to the partial enclosure 34. The lift mechanism 86 includes a linear actuator 88, such as a ball screw, lead screw, pneumatic cylinder and the like, and a guide 90 that slides along a rail 92. The rail 92 is coupled to the base support 84 by a hinge 94 so that the rail 92 of the lift mechanism 86 (i.e., direction of motion) may be controllably orientated through a range of angles between about 90 to about 60 degrees relative to horizontal. The lift mechanism 86 and hinge 94 allows the carrier assembly 30 holding a substrate 22 to be lowered into the partial enclosure 34 in various orientations. For example, to minimize the formation of bubbles upon the substrate 22 when interfacing with fluids disposed within the enclosure 34, the substrate 22 may be orientated at an angle during entry into the partial enclosure 34 and then rotated to a horizontal orientation once therein.

The partial enclosure 34 generally defines a container or electrolyte cell in which an electrolyte or other polishing/deposition fluid can be confined. The electrolyte used in processing the substrate 22 can include metals such as copper, aluminum, tungsten, gold, silver or other materials which can be electrochemically deposited onto a substrate. As one example, copper sulfate ($CuSO_4$) can be used as the electrolyte. Copper containing solutions used for plating are available from Shipley Ronel, a division of Rohm and Haas, headquartered in Philadelphia, Pa., under the tradename Ultrafill 2000.

The enclosure 34 typically includes an anode 26, a diffuser plate 44 and a polishing article 28 disposed therein. A polishing article 28, such as a polishing pad, is disposed and supported in the electrolyte cell on the diffuser plate 44. The partial enclosure 34 can be a bowl shaped member made of a plastic such as fluoropolymers, TEFLON®, PFA, PE, PES, or other materials that are compatible with plating chemistries. The partial enclosure 34 is connected to a shaft 32 on its lower surface that extends below the base 82. Alternatively, the partial enclosure 34 can be connected to a mounting platform that is connected to the shaft 32. The shaft 32 is connected to an actuator (not shown), such as a motor, e.g., a stepper motor, disposed in the base 82. The actuator is adapted to rotate the partial enclosure 34 about vertical axis x. In one embodiment, the shaft 32 defines a central passage through which fluid is delivered into the partial enclosure 34 through a plurality of ports 36 formed in the shaft 32.

The anode 26 is positioned at the lower portion of the enclosure 34 where it may be immersed in the electrolyte solution. Anode 26 can be a plate-like member, a plate having multiple holes formed therethrough or a plurality of anode pieces disposed in a permeable membrane or container. The anode 26 is preferably comprised of the material to be deposited, such as copper, nickel, aluminum, gold, silver, tungsten and other materials which can be electrochemically deposited on a substrate. In at least one embodiment, the anode 26 comprises a consumable anode that may require periodic replacement. Alternatively, the anode may comprise non-consumable anode of a material other than the deposited material, such as platinum for a copper deposition.

In at least one embodiment, the anode 26 is a ring-shaped member defining a central opening through which the fluid inlet of the shaft 32 is disposed. In embodiments where the anode 26 is plate-like, a plurality of holes may be formed through the anode to allow passage of electrolyte therethrough. The anode 26 can alternatively be a ring anode, a plate anode, or a chamber confining plating material, including a permeable chamber or other enclosure.

The polishing article 28 can be a polishing pad or other type of volume spacer that is compatible with the fluid environment and the processing specifications. The polishing article 28 is positioned at an upper end of the partial enclosure 34 and supported on its lower surface by the diffuser plate 44. The metal ions can be supplied from a fluid delivery line 40 having an outlet 42 positioned above the polishing article 28. The polishing article 28 may be disposed adjacent to or in contact with the anode 26.

Figure 3A:
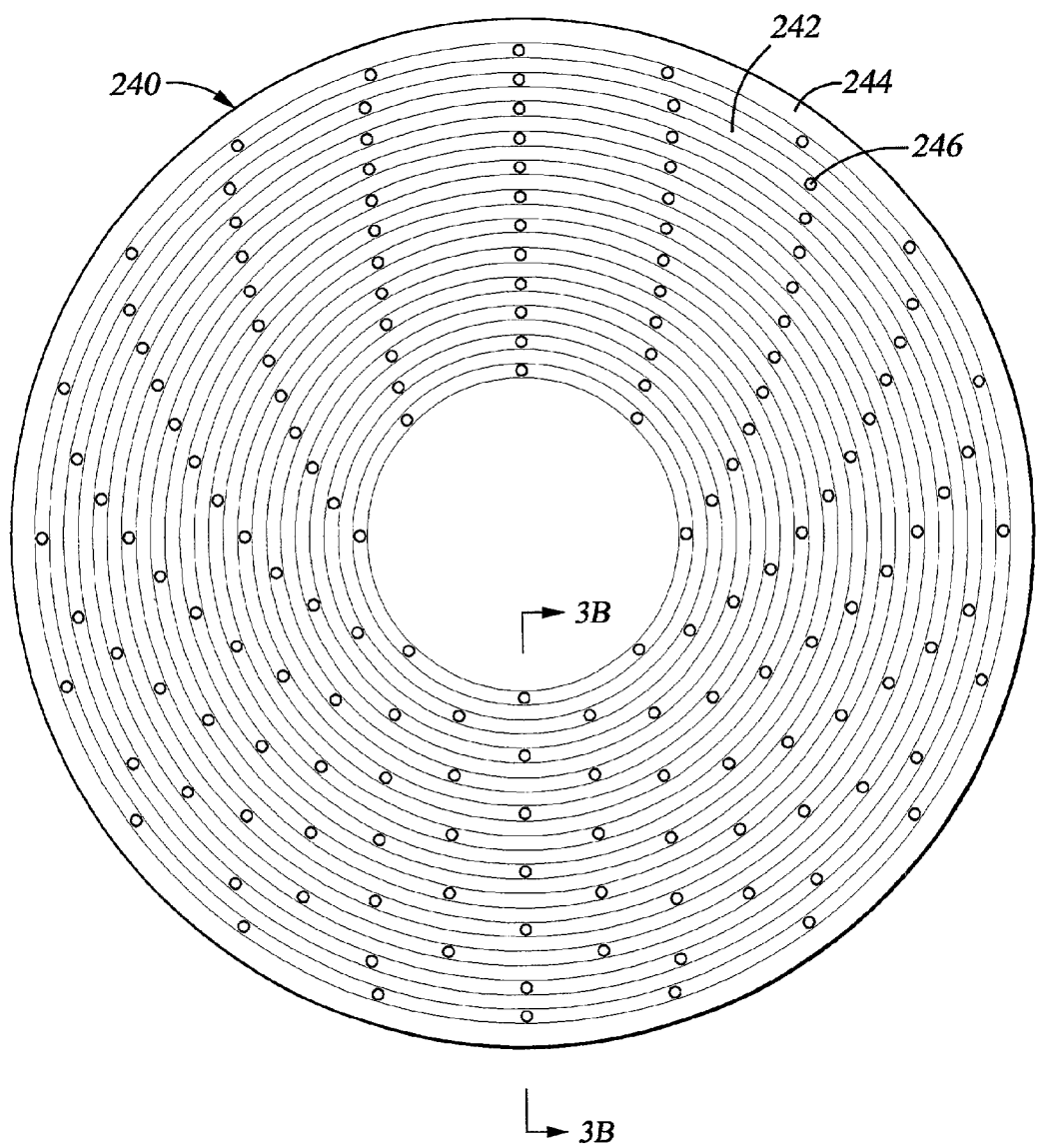
FIGS. 3A–3D are schematic views of embodiments of a polishing article having grooves and passages formed therein.

FIG. 3A is a top plan view of one embodiment of a polishing article according to aspects of the invention. A round pad 240 of the polishing article 28 is shown having a plurality of passages 246 of a sufficient size and organization to allow the flow of electrolyte to the substrate surface. The passages 246 are generally formed through the entire polishing article, such as round pad 240. The invention does contemplate passages that are only partially formed in the surface polishing article without fluid flow therethrough. The partial passages (not shown) may function as localized reservoirs of polishing material in the polishing article during polishing.

The passages 246 may be spaced between about 0.1 inches and about 1.0 inches from one another. The passages may be circular passages having a diameter of between about ten-thousandths of an inch and about ½ of an inch. Further the number and shape of the passages may vary depending upon the apparatus, processing parameters, and ECMPP composition being used.

Figure 4:
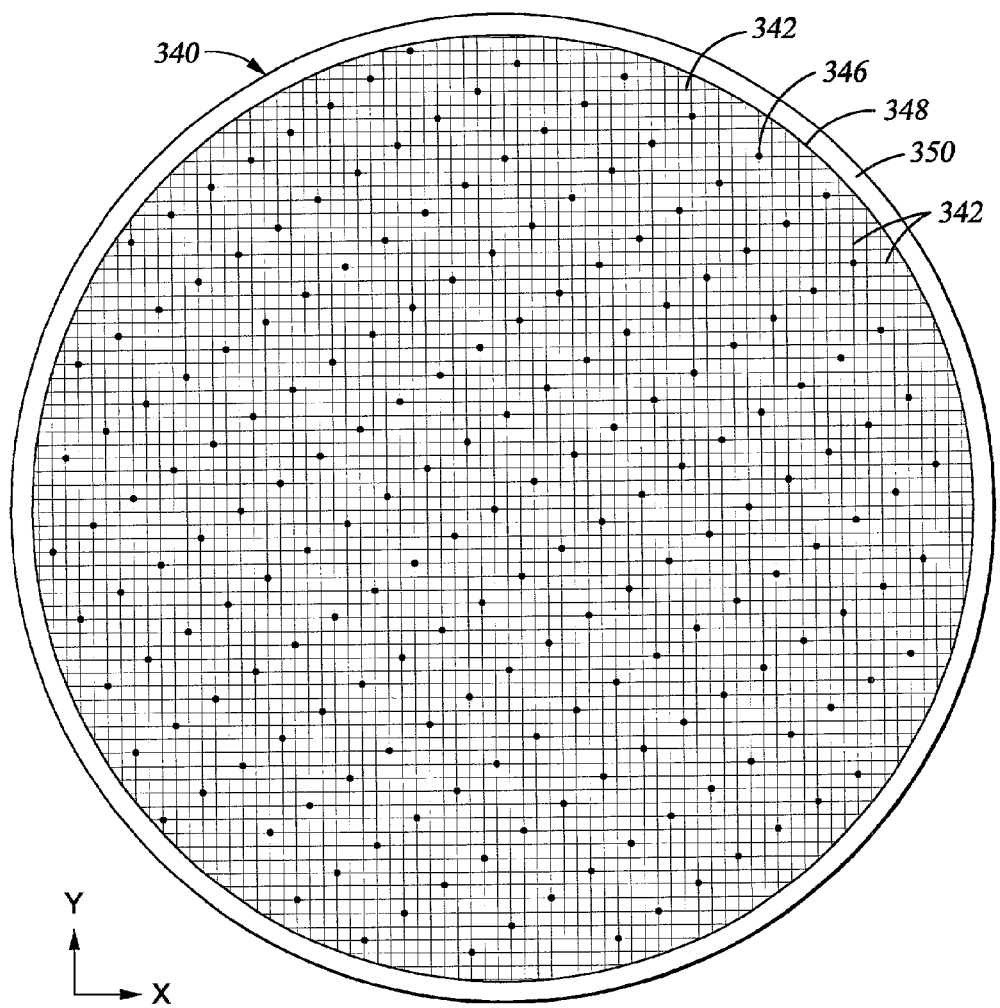
FIG. 4 is a schematic view of another embodiment of a polishing article having grooves and passages formed therein.
Figure 5:
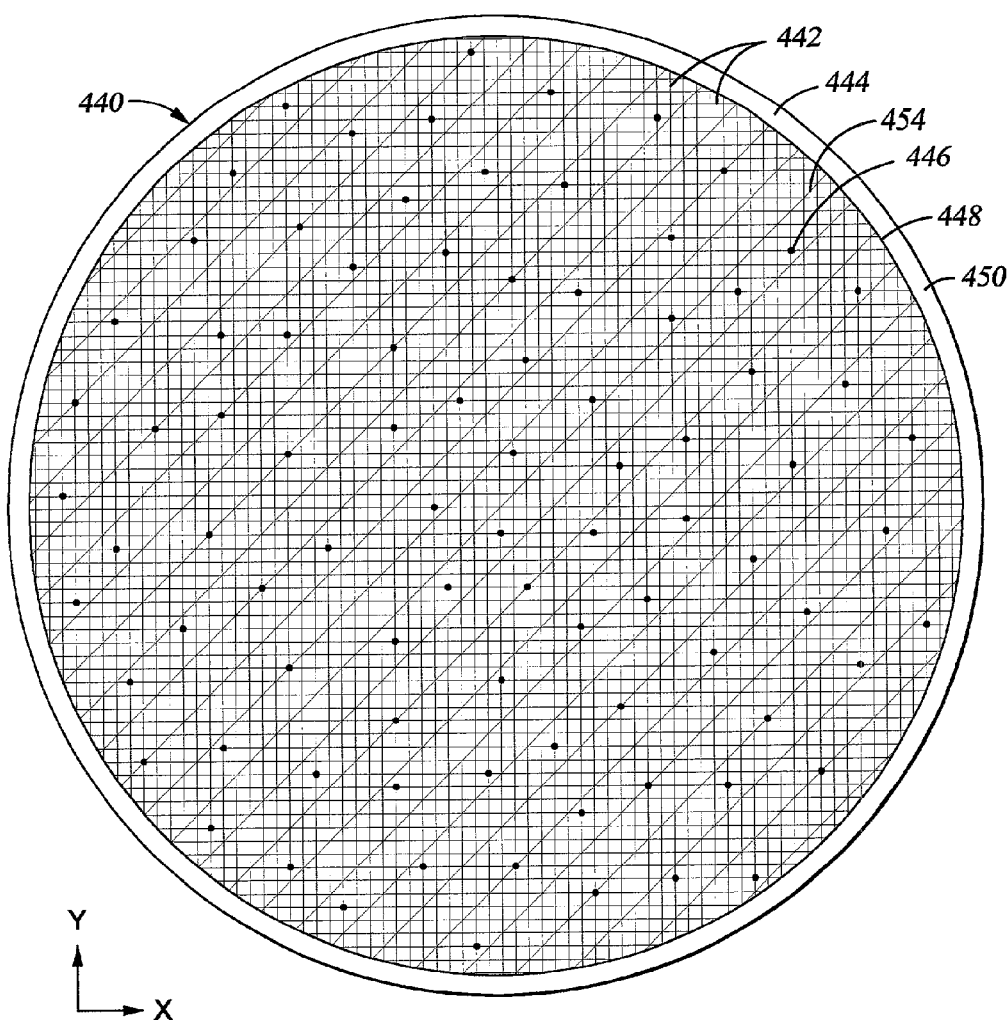
FIG. 5 is a schematic view of another embodiment of a polishing article having grooves and passages formed therein.

The passages may form a pattern as desired by the operator and may include, for example, X-Y grids, offset X-Y grids, circular rings, a triangular pattern, a random pattern, or a spiral pattern among others. FIGS. 3A, 4 and 5 respectively illustrate passages 246, 346, and 446 in a spiral pattern, an offset X-Y grid pattern, and a random pattern.

The polishing article may also comprise grooves 242 formed in the polishing surface 248 therein to assist transport of fresh electrolyte from the bulk solution into enclosure 34 to the gap between the substrate 22 and the polishing article. The grooves 242 may be spaced between about 30 mils and about 300 mils apart from one another. Generally, grooves formed in the polishing article have a width between about 5 mils and about 30 mils, but may vary in size as required for polishing. An example of a groove pattern includes grooves of about 10 mils wide spaced about 60 mils apart from one another. The grooves 242 may have various patterns, including a groove pattern of substantially circular concentric grooves on the polishing surface 248 as shown in FIG. 3A, an X-Y pattern as shown in FIG. 4 and a triangular pattern as shown in FIG. 5. While these patterns are shown and described herein, other patterns can also be used. The pattern of the grooves 242 and the pattern of the passages 246 are generally independent patterns.

Figure 3B:
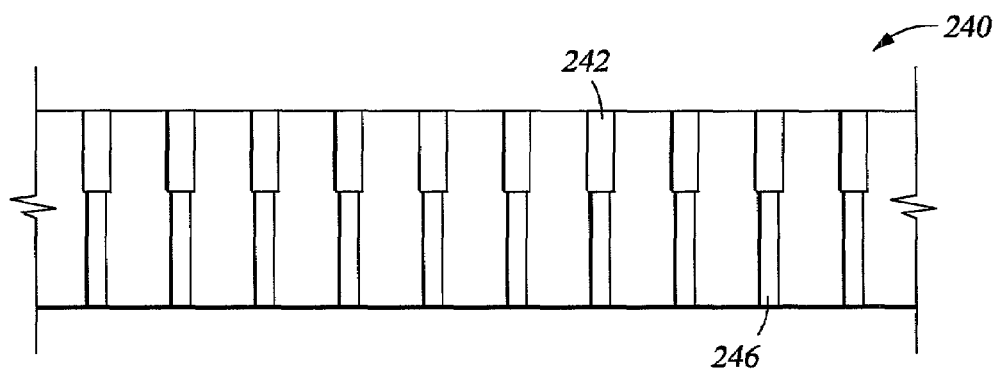

FIG. 3B is a side schematic view of one embodiment of the polishing article along the line B. The pattern of the passages 246 is adapted to have passages 246 partially formed in the grooves 242 to provide electrolyte directly to the grooves 242. Interconnection of the passages 246 and the grooves 242 is believed to improve flow of the electrolyte from the enclosure 34 to the substrate surface.

Figure 3C:
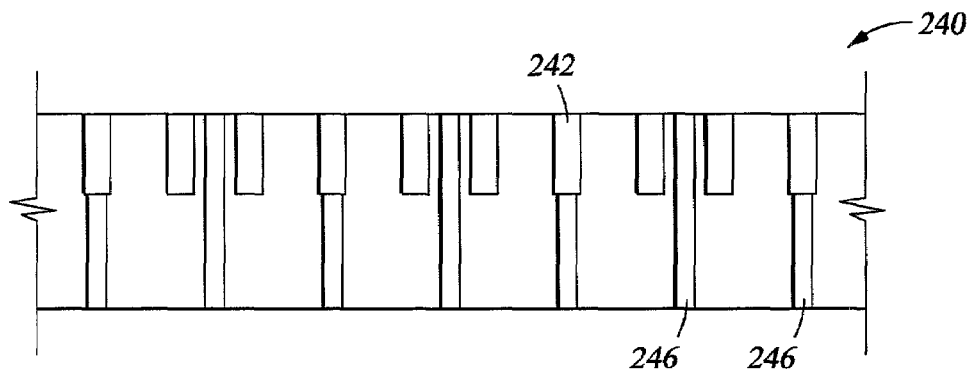
Figure 3D:
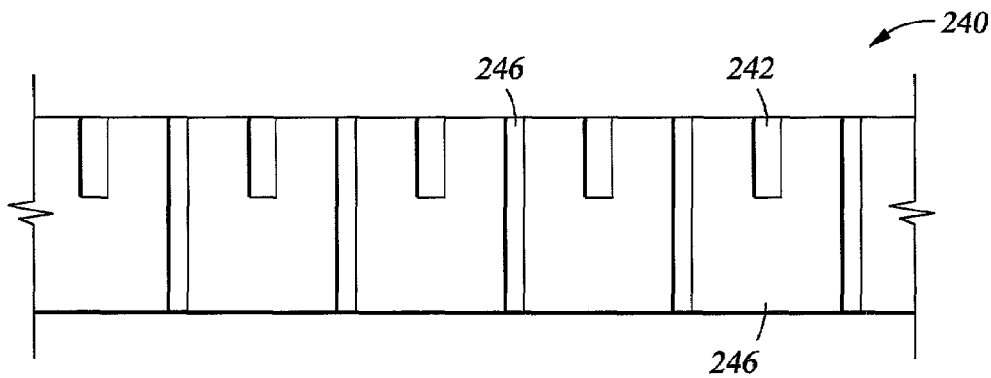

FIG. 3C is a side schematic view of another embodiment of the polishing article. The pattern of the passages 246 is adapted to provide electrolyte flow to the surface of the polishing pad by passages 246 and routing or partially routing the electrolyte away from the grooves 242 to the surface by passages 246'. In a further embodiment, passages 246 may be adapted to provide electrolyte directly to the surface of the polishing pad and bypassing all of the groves, as shown in FIG. 3D.

The polishing article of the round pad 240 may further have an extension or outer diameter 244 larger than the area required to polish a substrate. The outer diameter 244 may be free of passages. Conductive material may be disposed on the outer diameter 244 and/or inner diameter to provide or improve electrical conductance of the polishing article to the substrate surface during the ECMPP process. Further, the outer diameter 244 may be fixed, by adhesives, vacuum, or mechanical forces, to another pad or object in a processing system to provide increased stability and more uniform polishing performance during the ECMPP process.

FIG. 4 is a top plan view of another embodiment of a pad having grooves 342 disposed in an X-Y pattern on the polishing article 348 of a polishing pad 340. Passages 346 may be disposed at the intersections of the y-axis and x-axis horizontally disposed grooves, and may also be disposed on a y-axis groove, a x-axis groove, or disposed in the polishing article 348 outside of the grooves 342. The passages 346 and grooves 342 are disposed in the inner diameter 350 of the polishing article and the outer diameter of the polishing pad 344 is typically free of passages. The outer diameter 350 of the polishing pad 340 may be free of grooves and passages.

FIG. 5 is another embodiment of patterned polishing article 448. In this embodiment, grooves 442 may be disposed in an X-Y pattern with diagonally disposed grooves 454 intersecting the X-Y patterned grooves 442. The diagonal grooves 454 may be disposed at an angle between about 30° and about 60° from and of the X-Y grooves 442. Passages 446 may be disposed at the intersections of the X-Y grooves 442, the intersections of the X-Y grooves 442 and diagonal grooves 454, along any of the grooves 442 and 454, or disposed in the polishing article 448 outside of the grooves 442 and 454. As described above, another embodiment of the polishing article 448 may have a pattern of passages independent of any groove pattern, with intersection of passages and groves independent of one another. As shown in FIG. 5, the passages 446 and grooves 442 are disposed in the inner diameter of the polishing article and the outer diameter of the polishing pad 444 is typically free of passages. The outer diameter 450 of the polishing pad 440 may be free of grooves and passages.

It is believed that the grooves 242 provide a supply of electrolyte to the substrate surface that is evenly distributed on the substrate surface allowing for a more even deposition and polishing, and thereby increasing substrate uniformity. It is further believed that the use of intersecting grooves and passages will allow electrolyte to enter through one set of passages, be evenly distributed around the substrate surface, and then removed through a second set of passages.

The polishing article typically comprises a dielectric material (insulator or non-conductive material). Examples of dielectric material that may be used as polishing article include polyurethane pads commercially available from Rodel, Inc., of Phoenix, Ariz., or a PVDF pad from Asahi of Japan, or a fixed abrasive pad from 3M, of Minneapolis, Minn.

The polishing article may include conductive material for electroplating deposition process and electropolishing processes or a dielectric for both electroplating, electropolishing, and electroless deposition processes. For an electroplating deposition and electropolishing process, the polishing article may comprise a conductive polymer, or a dielectric material such as a polymer including polyurethane, with conductive elements or materials (not shown) embedded or formed therein, to provide a conductive path over the polishing article. The conductive elements are electrically connected to one another in the polishing article and may contact the substrate surface when the substrate is in contact with the polishing article. For an electroless deposition, the polishing article can form an insulator material, or a material of low conductance, such as polyurethane.

The polishing article may also include a porous polishing article, such as a porous polyurethane material to increase electrolyte flowthrough. The polishing article may comprise a plurality of pores of a sufficient size and organization to allow the flow of electrolyte to the substrate surface while preventing the flow of deposition by-products, such as accelerator and suppressor degradation by-products.

The polishing article may be disposed on a porous or sub-pad having passages formed therein (not shown) during the ECMPP process. The polishing article may be affixed, for example adhesively affixed, to a sub-pad with the sub-pad's passages aligned with the passages of the polishing article to allow flow of electrolyte from the enclosure 34 to the substrate surface. The use of a sub-pad, typically made of hard polishing materials such as the material used in an IC-1000 pad, is believed to provide mechanical support for the polishing article when contacting the substrate 22. The sub-pad may comprise an insulative material to limit any inadvertent deposition of material on the sub-pad.

Alternatively, a diffuser plate 44 is provided to support the polishing article in the partial enclosure 34 as shown in FIG. 1. The diffuser plate 44 can be secured in the partial enclosure 34 using fasteners such as screws 38 or other means such as snap or interference fit with the enclosure, being suspended therein and the like. The diffuser plate 44 can be made of a material such as a plastic, e.g., fluoropolymer, PE, TEFLON®, PFA, PES, HDPE, UHMW or the like. The diffuser plate 44, in at least one embodiment, includes a plurality of holes or channels 46 formed therein. The holes 46 are sized to enable fluid flow therethrough and to provide uniform distribution of electrolyte through the polishing article to the substrate 22. The polishing article 28 can be fastened to the diffuser plate 44 using adhesives that are compatible with the fluid environment and the processing requirements.

The diffuser plate 44 is preferably spaced from the anode 26 to provide a wider process window, thus reducing the sensitivity of plating film thickness to the anode dimensions, and to separate the accelerator and suppressor decomposition by-products, for example, a mono-sulfide compound degraded from an accelerator, such as bis(3-sulfopropyl) disulfide, $C_6H_{12}Na_2O_6S_4$, commercially available from the Raschig Corp. of Germany, from a main plating volume 38 defined between the polishing article 28 and the substrate 22.

While not shown, a membrane may be disposed between the anode 26 and the polishing article 28 to contain particles produced from the anode film from entering the enclosure 34 and depositing as particles on the substrate surface. For example, the membrane is permeable to electrolyte flow, but is not typically permeable to accelerator and suppressor degradation by-products on the anode surface.

The substrate carrier or head assembly 30 is movably positioned above the polishing article 28. The substrate carrier assembly 30 is vertically movable above the polishing article 28 and is laterally movable relative thereto. For example, the carrier assembly 30 may be rotatable about a vertical axis y. The x and y axis of the partial enclosure and the head assembly, respectively, are offset to provide orbital motion between the polishing article 28 and the substrate carrier assembly 30. Orbital motion is broadly described herein as an elliptical relative motion between the polishing article 28 and the substrate carrier assembly 30. The substrate carrier assembly 30 holds a substrate 22 with the deposition surface facing down towards the polishing article 28. Alternatively, the polishing article 28 may comprise a surface that may move in a translational or linear relative motion as well as rotatable, or circular rotational, relative motion to the substrate carrier assembly 30.

The substrate carrier assembly 30 generally includes a drive system 68, a head assembly 78 and a seat assembly 76. The drive system 68 is generally coupled to the guide 90 of the stanchion 80. The drive system 68 comprises a column 70 that extends from a power head 56 to support the seat assembly 76. The power head 56, which may be an electric or pneumatic motor, generally provides rotation to the column 70 along a central axis. The drive system 86 additionally includes an actuator 54 that is disposed within the column 70 and is coupled to the head assembly 78. The actuator 54, which may be a lead screw, pneumatic cylinder or other linear actuator, allows the head assembly 78 to move in relation to the seat assembly 76.

The seat assembly 76 generally includes a plurality of gripper fingers 74 disposed in a polar array about a gripper plate 72. The gripper plate 72 is coupled to the column 70 so that the gripper plate 72 moves with the drive system 68. In one embodiment, three gripper fingers 74 are provided. The gripper fingers 74 generally include a base member 66, an extension 64 and a contact finger 62. The contact fingers 62 are disposed at an angle to the extension 64. The extension 64 is coupled to the base member 66. The base member 66 is rotatably coupled to the gripper plate 72. The base member 66 generally includes an aperture that aligns with a hole in the gripper plate 72. A clevis pin or other shaft member is disposed through the hole and aperture to allow rotation of the gripper finger 74 in relation to the gripper plate 72. An actuator 60 is coupled between the extension 64 and the gripper plate 72. The actuator 60 moves the gripper finger 74 between an open and closed position. A spring 58 may be optionally disposed on the clevis pin to bias the gripper finger 74 towards one position. When the contact fingers 62 are moved inward, a notch 52 disposed at the ends of each contact finger 62 defines a seat 50 that is adapted to receive the substrate 22 from a transfer robot (not shown). In the inward position, the extensions 64 are disposed at a distance from each other that allows the substrate 22 and robot to pass therebetween.

Figure 2:
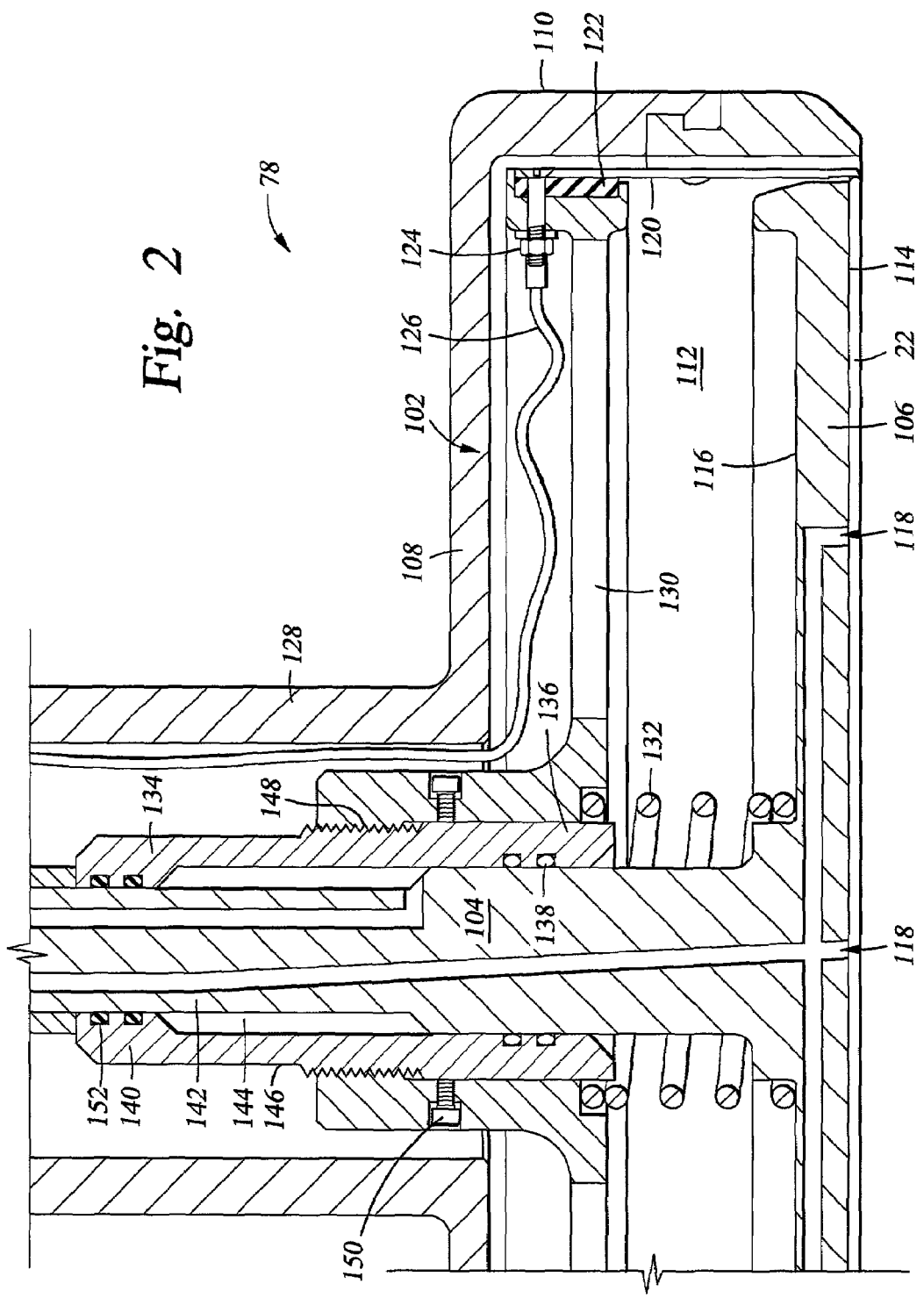
FIG. 2 is a partial cross sectional view of one embodiment of a carrier head assembly.

FIG. 2 depicts one embodiment of the head assembly 78. The head assembly 78 generally includes a housing 102, a stem 104, a support plate 106 and a plurality of substrate clamps 120 (one of the clamps 120 is shown). Generally, the housing 102 includes a hollow shaft 128 coupled to the actuator 54 at one end and terminating in a flange 108 at the opposite end. The flange 108 has a downwardly extending lip 110 that defines a central cavity 112.

The support plate 106 is disposed in the central cavity 112. The support plate 106 has a first side 114 and a second side 116. The substrate 22 is generally disposed proximate the first side 114 during processing. The first side 114 may additionally include one or more vacuum ports 118 disposed therein to restrain the substrate 22 proximate the first side 114.

The stem 104 is coupled to a second side 116 of the support plate 106. The stem 104 is generally orientated perpendicular to the support plate 106. The stem 104 may include passages disposed therein to provide vacuum or fluid to the first side 114 of the support plate 108 or other portions of the head assembly 78.

The substrate clamps 120 are generally comprised of a conductive material, such as copper. The substrate clamps 120 are coupled to a conductive ring 122 that electrically couples the individual substrate clamps 120. A screw typically fastens the substrate clamps 120 to the conductive ring 122 although other fasteners or fastening methods may be utilized. The conductive ring 122 generally includes a terminal 124 to allow the ring 122 to be electrically biased by a power source (not shown) coupled to the ring 122 by a lead 126 routed through the housing 102.

The conductive ring 122 is secured to a mounting plate 130 that is disposed in the central cavity 112 between the housing 102 and the support plate 106. The mounting plate 130 is generally movable relative to the support plate 106 so that the distance the substrate clamps 120 extend beyond the first side 114 of the support plate may be controlled. Generally, the mounting plate 130 is biased away from the support plate 106 by a spring 132 disposed therebetween.

To facilitate movement of the mounting plate 130 and substrate clamps 120, the mounting plate 130 is coupled to a sleeve 134 that is movably disposed around the stem 104. The sleeve 134 has a first diameter portion 136 that is sealed against the stem 104 at one end by a seal such as an o-ring 138. The sleeve 134 has a smaller, second diameter portion 140 that interfaces with a narrower portion 142 of the stem 104. The narrower portion 142 of the stem 104 is sealed to the sleeve 134 by an o-ring 152, thus creating a piston chamber 144 between the stem 104 and sleeve 134. As fluid, such as air, is applied or evacuated from the chamber 144, the resulting force applied between the sleeve 134 and stem 104 causes the sleeve 134 to move, thus correspondingly moving the substrate clamps 120. An outer portion 146 of the sleeve 134 is threaded and mates with a corresponding male threaded portion 148 disposed in the mounting plate 130. The amount of thread engagement between the mounting plate 130 and sleeve 134 may be adjusted to set the distance the substrate clamps 120 protrude from the support plate 106 at a predetermined amount. A set screw 150 in the mounting plate 130 may be tightened to prevent the mounting plate 130 from inadvertently turning about the sleeve 134.

Figure 6:
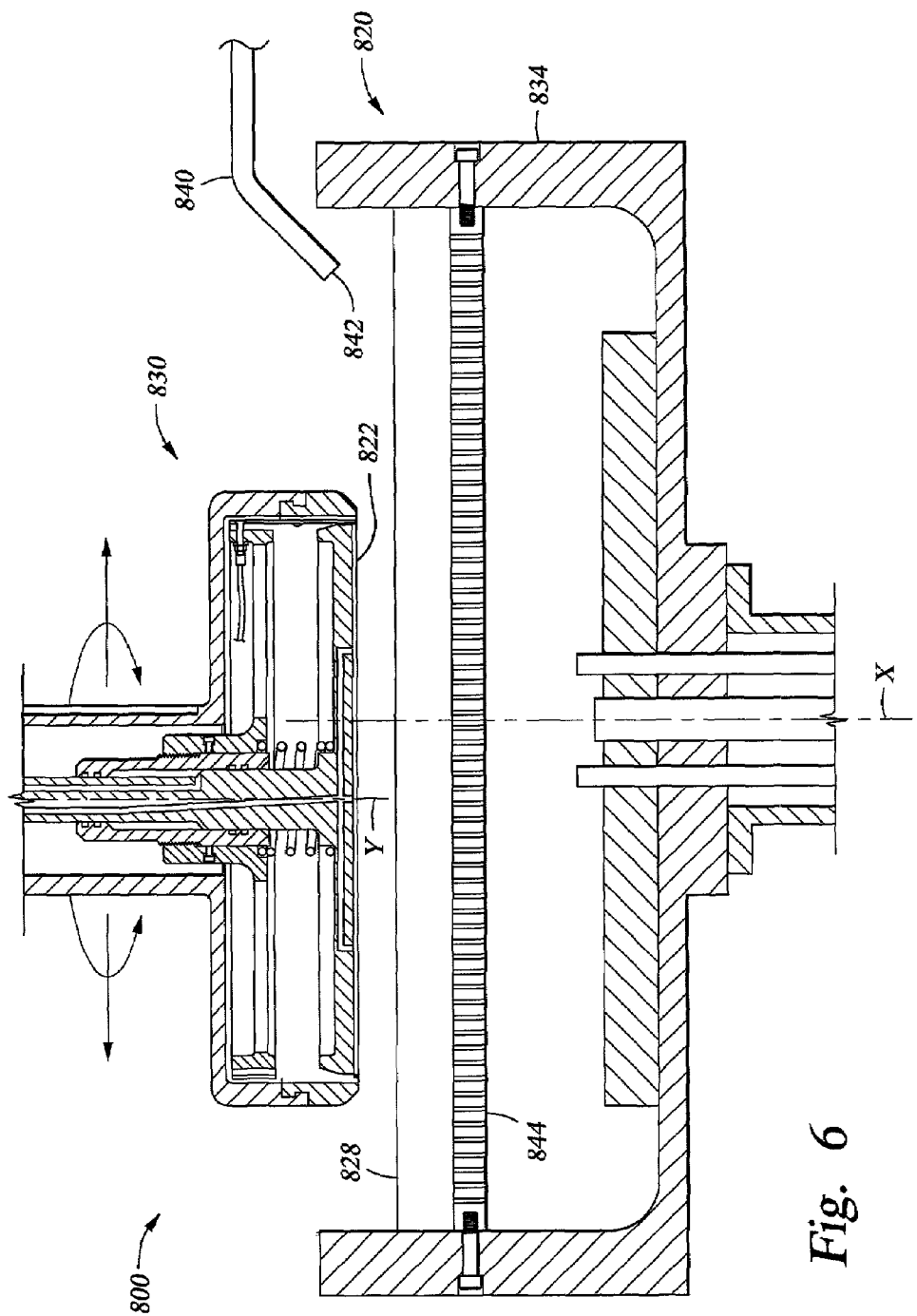
FIG. 6 is a cross sectional view of one embodiment of a processing apparatus showing a substrate contacting a polishing article.

FIG. 6 is cross sectional views of an alternative embodiment of an apparatus 800 of the invention for electroless deposition, electroless polishing, or combinations thereof, of a material on the substrate surface. An electroless deposition does not normally require the presence of an anode for deposition of a material. The apparatus 800 discloses an enclosure 834 that typically includes a diffuser plate 844 and a polishing article 828 disposed therein in a contact position 820 with substrate 822 disposed in carrier assembly 830 described above in FIG. 1. The contact position may be defined as a distance between the substrate 822 and the polishing article of about 100 µm or less.

The polishing article 828, such as the round polishing pad 140 described herein, is disposed and supported in the electrolyte cell on the diffuser plate 844. The partial enclosure 834 can be a bowl shaped member made of a plastic such as fluoropolymers, TEFLON®, PFA, PE, PES, or other materials that are compatible with plating chemistries. The enclosure 834 generally defines a container or electrolyte cell in which an electrolyte or other polishing/deposition fluid can be confined. The electrolyte used in processing the substrate 822 can include metals such as copper, nickel or other materials which can be electroless deposited onto a substrate.

The electrolyte is circulated into and out of the enclosure 834 to provide sufficient concentration of material to the substrate surface for processing. The electrolyte is typically provided to the enclosure 834 via a fluid delivery line 840 having an outlet 842 positioned above the polishing article 828. The electrolyte outlet from the enclosure 834 is not shown. In one aspect, the partial enclosure 834 can be initially filled with electrolyte prior to substrate processing and can then circulate the electrolyte into and out of the partial enclosure.

In operation, the polishing article 28 is disposed in an electrolyte in the enclosure 34. The substrate 22 on the carrier is disposed in the electrolyte and contacted with the polishing article. Electrolyte flow through the passages of the polishing article 28 and is distributed on the substrate surface by the grooves 142. Conductive material, such as copper, in the electrolyte is then deposited by an electrochemical method, such as electroless deposition or electroplating. The substrate 22 and polishing article 28 are rotated relative to one another polishing the substrate surface. A pressure between of about 2 psi or less is used between the substrate 22 and the polishing article 28.

In an electroplating deposition, a current in the range of about 0.5 Amps to about 5 Amps is applied to the substrate to deposit a seed layer or fill layer on the substrate adjacent to or in contact with the polishing article 28. Additionally, the current my vary depending upon the features to be filled, and it is contemplated that a current of up to about 20 amps may be used to fill features. For example, the current may be applied by a pulse modulation, or pulse plating method, to enhanced voidless fill of high aspect ratios. The pulse plating method typically provides an electrical pulse modification technique including applying a constant current density over the substrate for a first time period, than applying a constant reverse current density over the substrate for a second time period, and repeating the first and second steps to fill the structure. After the structure has been filled using this pulse modulation process, a constant current density may be applied over the substrate to deposit a metal layer over the substrate. The pulse modulation process is more fully described in co-pending U.S. patent application Ser. No. 09/569,833, entitled "Electrochemical Deposition For High Aspect Ratio Structures Using Electrical Pulse Modulation", filed on May 11, 2000, assigned to common assignee Applied Materials, Inc., and which is hereby incorporated by reference in its entirety to the extent not inconsistent with the invention.

For an electroless deposition, the electrolyte is flowed through the passages 146 and distributed by the grooves 142 and exposed to a conductive material on the substrate surface that acts as a catalyst to deposit material on the substrate 22. An example of an electroless deposition technique is more fully described in Descriptions of the electroless deposition process in Chapter 31 of *Modem Electroplating*, F. Lowenheim, (3d ed.) and in U.S. Pat. No. 5,891,513, and in co-pending U.S. patent application Ser. No. 09/350,877, filed on Jul. 9, 1999, assigned to common assignee Applied Materials, Inc., and which are hereby incorporated by reference in their entirety to the extent not inconsistent with the invention.

Figure 7:
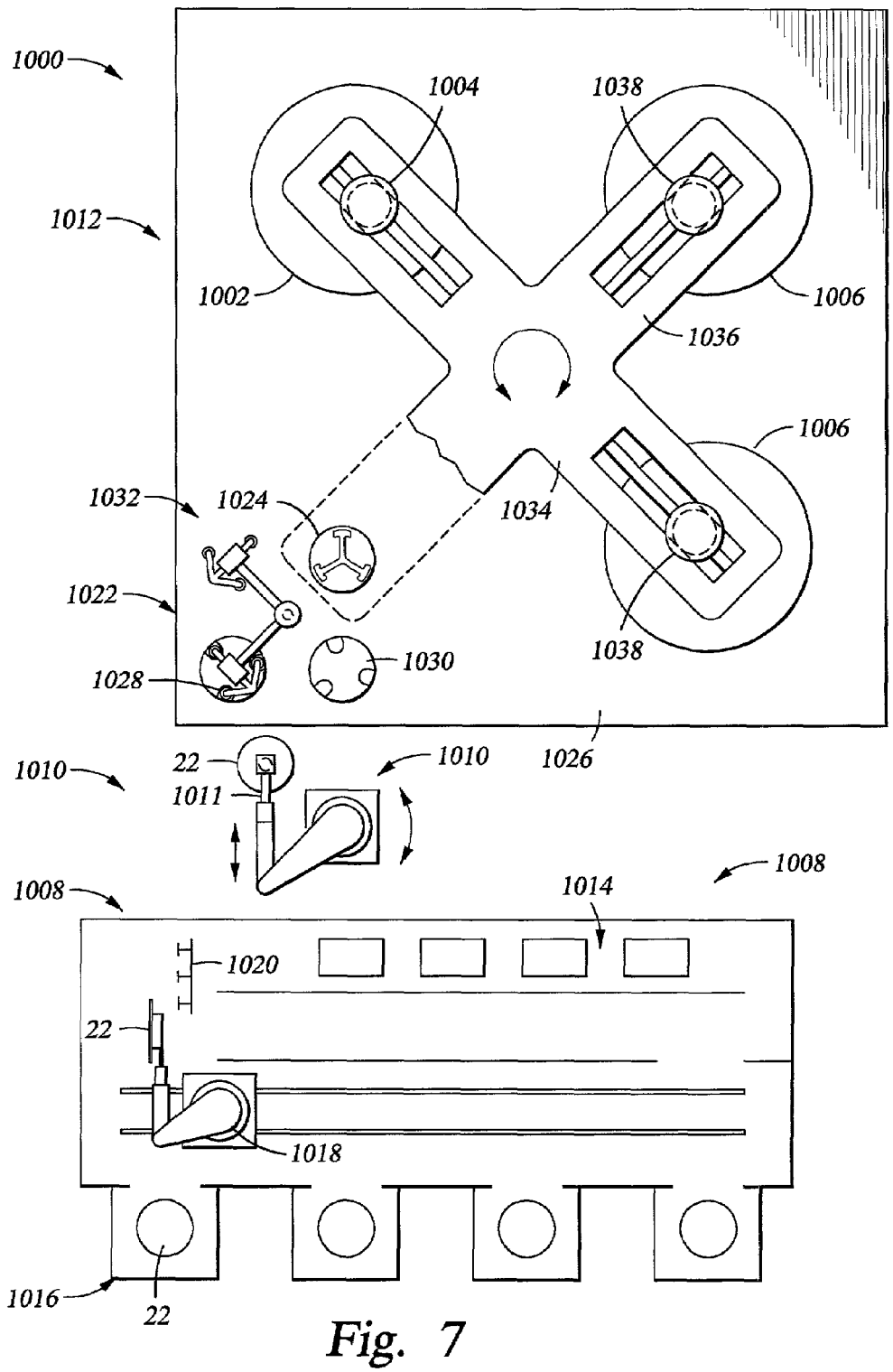
FIG. 7 is a plan view of one embodiment of a processing platform incorporating embodiments of the processing apparatus of the invention.

FIG. 7 depicts one embodiment of a processing apparatus 1000 having at least one plating station 1002 and at least one conventional polishing or buffing station 1006. One polishing tool that may be adapted to benefit from the invention is a MIRRA® chemical mechanical polisher available from Applied Materials, Inc. located in Santa Clara, Calif. The exemplary apparatus 1000 generally comprises a factory interface 1008, a loading robot 1010, and a depositing and planarizing module 1012, described as apparatus 20 in FIG. 1. Generally, the loading robot 1010 is disposed proximate the factory interface 1008 and the depositing and planarizing module 1012 to facilitate the transfer of substrates 22 therebetween.

The factory interface 1008 generally includes a cleaning module 1014 and one or more wafer cassettes 1016. An interface robot 1018 is employed to transfer substrates 22 between the wafer cassettes 1016, the cleaning module 1014 and an input module 1020. The input module 1020 is positioned to facilitate transfer of substrates 22 between the depositing and planarizing module 1012 and the factory interface 1008 by the loading robot 1010. For example, unprocessed substrates 22 retrieved from the cassettes 1016 by the interface robot 1018 may be transferred to the input module 1020 where the substrates 22 may be accessed by the loading robot 1010 while processed substrates 22 returning from the depositing and planarizing module 1012 may be placed in the input module 1020 by the loading robot 1010. Processed substrates 22 are typically passed from the input module 1020 through the cleaning module 1014 before the factory interface robot 1018 returns the cleaned substrates 22 to the cassettes 1016. An example of such a factory interface 1008 that may be used to advantage is disclosed in U.S. patent application Ser. No. 09/547,189, filed Apr. 11, 2000, assigned to common assignee Applied Materials, Inc., and which is hereby incorporated by reference.

The loading robot 1010 is generally positioned proximate the factory interface 1008 and the depositing and planarizing module 1012 such that the range of motion provided by the robot 1010 facilitates transfer of the substrates 22 therebetween. An example of a loading robot 1010 is a 4-Link robot, manufactured by Kensington Laboratories, Inc., located in Richmond, Calif. The exemplary loading robot 1010 has a gripper 1011 that may orientate the substrate 22 in either a vertical or a horizontal orientation.

The exemplary depositing and planarizing module 1012 has a transfer station 1022 and a carousel 1034 in addition to the plating station 1002 and the polishing station 1006, all of which are disposed on a machine base 1026. The depositing and planarizing module 1012 may comprise one polishing module and two plating modules. Alternatively, the depositing and planarizing module 1012 may comprise one plating module and two polishing modules. In a further alternative, a polishing module 1120 may be provided for polishing a substrate following processing by the methods described herein or in the apparatus described herein.

In one embodiment, the transfer station 1022 comprises at least an input buffer station 1028, an output buffer station 1030, a transfer robot 1032, and a load cup assembly 1024. The loading robot 1010 places the substrate 22 onto the input buffer station 1028. The transfer robot 1032 has two gripper assemblies, each having pneumatic gripper fingers that grab the substrate 22 by the substrate's edge. The transfer robot 1032 lifts the substrate 22 from the input buffer station 1028 and rotates the gripper and substrate 22 to position the substrate 22 over the load cup assembly 1034, then places the substrate 22 down onto the load cup assembly 1024. An example of a transfer station that may be used to advantage is described by Tobin in U.S. patent application Ser. No. 09/314,771, filed Oct. 10, 1999, assigned to common assignee Applied Materials, Inc., and which is hereby incorporated by reference.

The carousel 1034 is generally described in U.S. Pat. No. 5,804,507, issued Sep. 8, 1998 to Tolles et al. and is hereby incorporated herein by reference in its entirety. Generally, the carousel 1034 is centrally disposed on the base 1026. The carousel 1034 typically includes a plurality of arms 1036. The arms 1036 generally each supporting a polishing head 1038 while one arm supports a carrier head assembly 1004. One of the arms 1036 is shown in phantom such that the transfer station 1022 may be seen. The carousel 1034 is indexable such that the polishing head 1038 and carrier head 1004 may be moved between the modules 1002, 1006 and the transfer station 1022.

Generally the polishing head 1038 retains the substrate 22 while pressing the substrate against a polishing material (not shown) disposed on the polishing stations 1006. The polishing station 1006 generally rotates to provide a relative motion between the substrate 22 retained by the polishing head 1038 and the polishing material. Typically, a polishing fluid is provided to assist in the material removal from the substrate 22. One polishing head that may be utilized is a TITAN HEAD™ wafer carrier manufactured by Applied Materials, Inc., Santa Clara, Calif.

Figure 8:
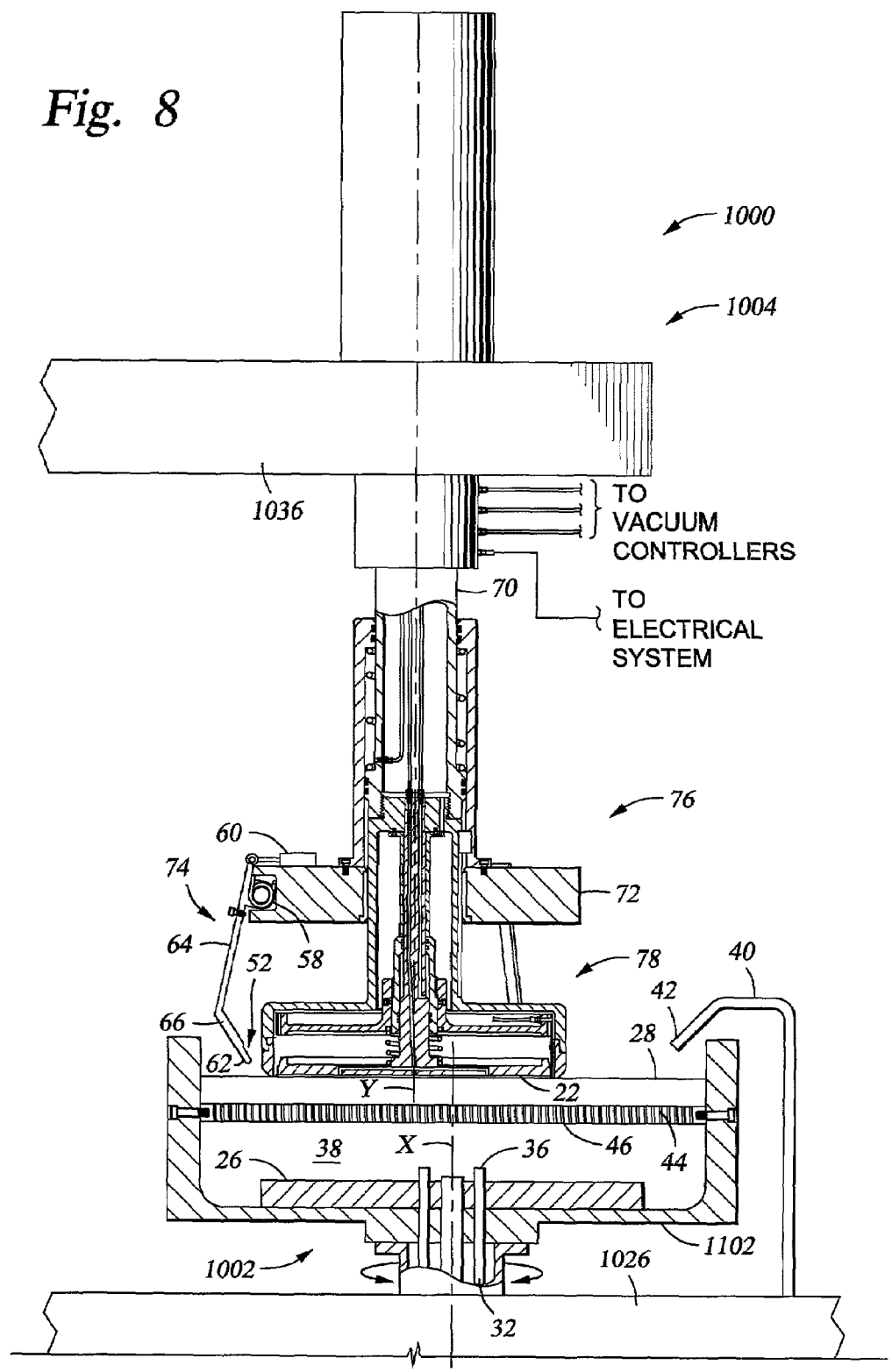
FIG. 8 is a sectional view of a plating station of the platform of FIG. 7.

FIG. 8 depicts a sectional view of the substrate carrier head assembly 1004 supported above the plating station 1006. In one embodiment, the substrate carrier head assembly 1004 is substantially similar to the substrate carrier assembly 30 described above and including head assembly 78, a seat assembly 76, enclosure 34, and polishing article 28 as shown in FIGS. 1 and 8. Similarly, the plating station 1006 includes a partial enclosure 1102 that defines an electrolyte cell to facilitate metal deposition on the substrate 22 that is substantially similar to the enclosure 30 described above. The enclosure 1102 of the plating station 1006 is coupled to a motor that provides rotation of the enclosure 1102.

The arrangement of the plating stations 1006 and polishing stations 1002 on the depositing and planarizing module 1012 allow for the substrate 22 to be sequentially plated or polishing by moving the substrate between stations. The substrate 22 may be processed in each station 1002, 1006 while remaining in it respective head or carrier 1038, 1004, or the substrate may be switched between heads by offloading the substrate from one head into the load cup and loading the substrate into the other polishing head. Optionally, the depositing and planarizing module 1012 may comprise only one type of head may be utilized (i.e., all polishing heads 1038 or all carrier heads 1004).

While foregoing is directed to various embodiments of the invention, other and further embodiments of the invention may be devised without departing from the basic scope thereof, and the scope thereof is determined by the claims that follow.

What is claimed is:

1. An article of manufacture for polishing a substrate comprising:

a polishing article having a center portion and a perimeter portion, a polishing surface defined on the center portion and the perimeter portion;

a plurality of perforations formed in at least a portion of the center portion of the polishing article for flow of material therethrough;

a plurality of grooves disposed in the polishing surface; and a conductive contact element or a dielectric material having conductive elements formed in the polishing surface.

2. The article of claim 1, wherein at least one of the plurality of perforations intersects with at least one of the plurality of grooves on the polishing surface.

3. The article of claim 1, wherein each of the perforations has a diameter of between about 0.016 and about 0.5 inches and are disposed between about 0.1 and about 1.0 inch from one another.

4. The article of claim 1, wherein the plurality of grooves form a pattern comprising substantially circular concentric grooves, an X-Y pattern, or a triangular pattern on the polishing surface.

5. The article of claim 4, wherein a portion of the plurality of grooves are non-intersecting and are spaced between about 0.03 and about 0.3 inches apart.

6. The article of claim 1, wherein the polishing article is disposed on a perforated sub-pad.

7. The article of claim 6, wherein the perforated sub-pad comprises a plurality of pores disposed therein for flow of material therethrough and the plurality of pores of the perforated sub-pad and the plurality of perforations in the polishing article are aligned for flow of material through the perforated sub-pad and the polishing article.

8. The article of claim 1, wherein the center portion of the polishing article comprises a dielectric material having conductive elements disposed therein, wherein the conductive elements are electrically connected to one another in the polishing article.

9. The article of claim 1, wherein the perimeter portion of the polishing article conducts electricity across the upper surface of the perimeter portion of the polishing article.

10. The article of claim 9, wherein the perimeter portion of the polishing article comprises a dielectric material having conductive elements disposed therein, wherein the conductive elements are electrically connected to one another in the polishing article.

11. The article of claim 1, wherein the perimeter portion is a non-conductive polishing portion.

12. An article of manufacture for polishing a substrate comprising:

a polishing article having a polishing surface;

a plurality of perforations formed in at least a portion of the polishing article for flow of material therethrough; and a plurality of grooves disposed in the polishing surface, wherein the polishing article comprises a conductive contact element formed therein or a dielectric material having conductive contact elements disposed therein and is adapted to conduct electricity across the polishing surface.

13. The article of claim 12, wherein a portion of the plurality of perforations intersect with a portion of the plurality of grooves on the polishing surface.

14. The article of claim 12, wherein each of the perforations has a diameter of between about 0.016 and about 0.5 inches and are disposed between about 0.1 and about 1.0 inch from one another.

15. The article of claim 12, wherein the plurality of grooves form a pattern comprising substantially circular concentric grooves, an X-Y pattern, or a triangular pattern on the polishing surface.

16. The article of claim 15, wherein a portion of the plurality of grooves are non-intersecting and are spaced between about 30 mils and about 300 mils apart.

17. The article of claim 12, wherein the polishing article is disposed on a perforated sub-pad.

18. The article of claim 17, wherein the perforated sub-pad comprises a plurality of pores disposed therein for flow of material therethrough and the plurality of pores of the perforated sub-pad and the plurality of perforations in the polishing article are aligned for flow of material through the perforated sub-pad and the polishing article.

19. The article of claim 12, wherein the polishing article has a center portion and a perimeter portion, the center portion having a plurality of perforations.

20. The article of claim 19, wherein the perimeter portion of the polishing article conducts electricity to the substrate surface.

21. An article of manufacture for polishing a substrate comprising:

a polishing article having at least one conductive contact element formed therein that provides a conductive path over at least a portion of the polishing surface;

a plurality of perforations formed in at least a portion of the polishing article for flow of material therethrough; and a plurality of grooves disposed in the polishing surface, wherein each of the perforations has a diameter of between about 0.016 and about 0.5 inches and are disposed between about 0.1 and about 1.0 inch from one another.

22. An article of manufacture for polishing a substrate comprising:

a polishing article having at least one conductive contact element formed therein that provides a conductive path over at least a portion of the polishing surface;

a plurality of perforations formed in at least a portion of the polishing article for flow of material therethrough; and a plurality of grooves disposed in the polishing surface, wherein the polishing article is disposed on a perforated sub-pad.

23. The article of claim 22, wherein the perforated sub-pad comprises a plurality of pores disposed therein for flow of material therethrough and the plurality of pores of the perforated sub-pad and the plurality of perforations in the polishing article are aligned for flow of material through the perforated sub-pad and the polishing article.

24. An article of manufacture for polishing a substrate comprising:

a polishing article having a conductive polishing surface comprising a conductive element that provides a conductive path over the polishing surface;

a plurality of perforations formed in at least a portion of the polishing article for flow of material therethrough; and a plurality of grooves disposed in the polishing surface.

25. The article of claim 24, wherein the conductive polishing surface comprises a dielectric material having conductive elements embedded therein.

26. An article of manufacture for polishing a substrate comprising:

a polishing article having a polishing surface comprising a center portion and a perimeter portion;

a plurality of perforations formed in at least the center portion of the polishing article for flow of material therethrough; and a plurality of grooves disposed in at least the center portion of the polishing surface, wherein at least one of the center portion or the perimeter portion of the polishing article comprises a conductive contact element or a dielectric material with a plurality of conductive elements formed therein and is adapted to conduct electricity across the polishing surface.

27. The article of claim 26, wherein the perimeter portion is free of perforations and grooves.

28. The article of claim 26, wherein the center portion is dielectric and the perimeter portion is conductive.

29. The article of claim 28, wherein the perimeter portion comprises a dielectric material having conductive elements disposed therein, wherein the conductive elements are electrically connected to one another in the polishing article to conduct electricity across the perimeter portion of the polishing surface.

30. An article of manufacture for polishing a substrate, comprising:

a polishing article having a perimeter portion and a center portion;

a polishing surface defined on the center portion, wherein the center portion of the polishing article comprises at least one conductive contact element that conducts electricity across the polishing surface;

a plurality of perforations formed in the center portion of the polishing article for flow of material therethrough, wherein each of the perforations has a diameter of between about 0.016 and about 0.5 inches and are disposed between about 0.1 and about 1.0 inch from one another; and a plurality of grooves disposed in the polishing surface, wherein a portion of the plurality of grooves are non-intersecting and are spaced between about 0.03 and about 0.3 inches apart.

31. The article of claim 30, wherein the polishing article is disposed on a perforated sub-pad comprising a plurality of pores disposed therein for flow of material therethrough, wherein the plurality of pores of the perforated sub-pad and the plurality of perforations in the polishing article are aligned for flow of material through the perforated sub-pad and the polishing article.

* * * * *

UNITED STATES PATENT AND TRADEMARK OFFICE
CERTIFICATE OF CORRECTION

| | | |
|---|---|---|
| PATENT NO. | : 7,059,948 B2 | Page 1 of 1 |
| APPLICATION NO. | : 10/026854 | |
| DATED | : June 13, 2006 | |
| INVENTOR(S) | : Li et al. | |

It is certified that error appears in the above-identified patent and that said Letters Patent is hereby corrected as shown below:

Title page, Item (75), Inventors: Please change "Llang-Yuh" to --Liang-Yuh--

Title Page, Item (56), References Cited, U.S. PATENT DOCUMENTS: Please include the following reference:

--5,328,716      7/1994      Buchanan--

Column 2, Lines 4-5: Change "substra The polishing pressure preferably has e next." to --substrate to the next.--

Column 6, Line 46: After "from", change "and" to --any--

Column 7, Line 64: Change "C6H12Na2O6S4" to --$C_6H_{12}Na_2O_6S_4$--

Column 10, Line 35: Delete "between"

Column 10, Line 41: Change "my" to --may--

Column 11, Line 1: Change "*Modem*" --*Modern*--

Column 12, Line 17: Change "supporting" to --support--

Column 12, Line 57: Delete "may be utilized"

Signed and Sealed this

Sixteenth Day of January, 2007

JON W. DUDAS
*Director of the United States Patent and Trademark Office*